United States Patent
Tang et al.

(10) Patent No.: US 12,444,223 B2
(45) Date of Patent: Oct. 14, 2025

(54) APPARATUS AND METHOD FOR PRODUCING LABELLED CURSIVE HANDWRITTEN TEXT SAMPLES WITH CONTEXT STYLE VARIABILITY SUITABLE FOR FORMING TRAINING DATA FOR TRAINING MACHINE LEARNING NEURAL NETWORKS FOR CURSIVE HANDWRITING RECOGNITION

(71) Applicant: Hong Kong Applied Science and Technology Research Institute Company Limited, Hong Kong (HK)

(72) Inventors: Wai Kai Arvin Tang, Hong Kong (HK); Sergio Rodolfo Cruz Gomez, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 280 days.

(21) Appl. No.: 18/463,326

(22) Filed: Sep. 8, 2023

(65) Prior Publication Data

US 2025/0087007 A1   Mar. 13, 2025

(51) Int. Cl.
*G06V 30/302*    (2022.01)
*G06F 40/169*    (2020.01)
*G06V 30/19*     (2022.01)

(52) U.S. Cl.
CPC .......... *G06V 30/302* (2022.01); *G06F 40/169* (2020.01); *G06V 30/19127* (2022.01)

(58) Field of Classification Search
CPC .......... G06V 30/302; G06V 30/19127; G06V 10/82; G06F 40/169
See application file for complete search history.

(56) References Cited

U.S. PATENT DOCUMENTS

| | | | |
|---|---|---|---|
| 7,483,570 | B1 | 1/2009 | Knight |
| 7,929,768 | B2 | 4/2011 | Zhang et al. |

(Continued)

FOREIGN PATENT DOCUMENTS

| | | |
|---|---|---|
| CN | 113516136 A | 10/2021 |
| CN | 114255159 A | 3/2022 |
| CN | 114898380 A | 8/2022 |

OTHER PUBLICATIONS

International Search Report and Written Opinion of corresponding PCT application No. PCT/CN2023/127239 mailed on May 11, 2024.

(Continued)

*Primary Examiner* — Christopher Wait
(74) *Attorney, Agent, or Firm* — Idea Intellectual Limited; Sam T. Yip (57) ABSTRACT

The present invention provides an apparatus for producing labelled cursive handwritten text samples with context style variability, and method of training and using the same. The apparatus comprises: a word embedding units configured for encoding an input text to obtain an input text word embedding; a word embedding unit configured for encoding a handwriting context style description into a context style description embedding; a transformer configured for transforming the context style description embedding to obtain a handwriting context style feature embedding; a feature embedding combiner configured for combining the handwriting context style feature embedding and the input text word embeddings to form a combined feature embedding; a generator configured for generating a synthetic image containing characters occurred in the input text with the handwriting context style defined in the handwriting context style description and context style variability introduced by the generator.

12 Claims, 4 Drawing Sheets

(56) References Cited

U.S. PATENT DOCUMENTS

| | | | |
|---|---|---|---|
| 11,195,172 | B2 | 12/2021 | Farivar et al. |
| 11,257,267 | B2 | 2/2022 | Szarzynski et al. |
| 11,551,034 | B2 | 1/2023 | Karimi et al. |
| 11,587,275 | B2 | 2/2023 | Szarzynski et al. |
| 11,587,343 | B2 | 2/2023 | Zhang et al. |
| 11,756,244 | B1 | 9/2023 | Bhunia et al. |
| 2007/0211943 | A1 | 9/2007 | Loeb |
| 2019/0272447 | A1 | 9/2019 | Wong et al. |
| 2021/0166013 | A1* | 6/2021 | Tensmeyer ............. G06N 3/045 |
| 2022/0058842 | A1 | 2/2022 | Kotani et al. |
| 2022/0147358 | A1 | 5/2022 | Perdomo Ortiz et al. |

OTHER PUBLICATIONS

Jie Chang et al., "Chinese Handwriting Imitation with Hierarchical Generative Adversarial Network", 2018 British Machine Vision Conference, British Machine Vision Association, 2018.

Shusen Tang et al., "FontRNN: Generating Large-scale Chinese Fonts via Recurrent Neural Network", Computer Graphics Forum, John Wiley & Sons Ltd., 2019, vol. 38, No. 7, pp. 567-577.

Tom S. F. Haines et al., "My Text in Your Handwriting", ACM Transactions on Graphics, Association for Computing Machinery, 2015.

Samaneh Azadi et al., "Multi-Content GAN for Few-Shot Font Style Transfer", 2018 IEEE/CVF Conference on Computer Vision and Pattern Recognition, Institute of Electrical and Electronics Engineers, 2018, pp. 7564-7573.

Kai Yang et al., "Handwriting Imitation with Generative Adversarial Networks", Proceedings of the 11th International Conference on Computer Engineering and Networks, Lecture Notes in Electrical Engineering 808, Springer, 2022, pp. 189-195.

Canjie Luo et al., "SLOGAN: Handwriting Style Synthesis for Arbitrary-Length and Out-of-Vocabulary Text", IEEE Transactions on Neural Networks and Learning Systems, Institute of Electrical and Electronics Engineers, 2022.

Sharon Fogel et al., "ScrabbleGAN: Semi-Supervised Varying Length Handwritten Text Generation", 2020 IEEE/CVF Conference on Computer Vision and Pattern Recognition (CVPR), IEEE, 2020, pp. 4324-4332.

* cited by examiner

APPARATUS AND METHOD FOR PRODUCING LABELLED CURSIVE HANDWRITTEN TEXT SAMPLES WITH CONTEXT STYLE VARIABILITY SUITABLE FOR FORMING TRAINING DATA FOR TRAINING MACHINE LEARNING NEURAL NETWORKS FOR CURSIVE HANDWRITING RECOGNITION

FIELD OF THE INVENTION

The present invention generally relates to artificial intelligence and deep learning technologies for character generation, and particularly to machine-learning (ML)-based systems for producing labelled cursive handwritten text samples with context style variability, and methods of training and using the same.

BACKGROUND OF THE INVENTION

Handwriting recognition plays a crucial role in modern societies as it is a prerequisite for automating numerous mundane manual tasks involving written text. These tasks include identifying names, postal addresses, and other information on various filled-in forms, bank checks, and mail, among others. Despite the significant attention and development optical character recognition (OCR) has received in recent decades, it still remains a challenging problem due to the presence of cursive writing, touching strokes, and complex shapes.

Training a ML neural network for handwriting recognition is time consuming and exhausts an enormous amount of computing resources because a wide range of handwriting styles exist, and the industry desires robust systems that recognize an abundant range of writing styles. The vast range of recognizable handwriting styles sought by the industry makes character recognition training to be prohibitively expensive, simply due to the sheer number of handwriting samples required for an adequate training dataset. Moreover, some languages, for example Chinese languages, include large number of characters, resulting in exponentially higher computing expense, time consumption, and financial expenditure in order to create and maintain a ML neural network capable of recognizing a sufficient variety of handwritten Chinese characters.

Generative adversarial networks (GANs) have proven to be successful generative models in many computer vision tasks. A GAN model formulates a generative model based on the game theory of a minimax game between generator and discriminator models. The generator model tries to generate "fake" samples as close to the real ones and the discriminator model tries to discriminate "fake" samples from real ones. An extension of the GAN is the conditional GAN, where the sample generation is conditioned upon an input, which can be a discrete label, a text, or an image.

Some approaches generate training data by creating image from text and focus on already existing datasets or printed handwriting fonts. For example, the ScrabbleGAN method uses a GAN to learn from the IAM dataset to create images from text for handwritten word generation. However, existing datasets like the IAM dataset predominantly contain fixed images and text, which restrict the occurrence and variability of characters. Conventional GANs are constrained by the training data and can only produce handwriting styles that already exist or are similar, which are mostly non-cursive words, without introducing additional variability.

SUMMARY OF THE INVENTION

According to one aspect of the present invention, an apparatus for generating cursive handwritten text is provided. The apparatus comprises: an input text word embedding unit configured for encoding an input text to obtain an input text word embedding in an input text feature space; a context style word embedding unit configured for encoding a handwriting context style description into a context style description embedding in a handwriting context style feature space; a word embedding transformer configured for transforming the context style description embedding from the handwriting context style feature space to the input text feature space to obtain a handwriting context style feature embedding; a feature embedding combiner configured for combining the handwriting context style feature embedding and the input text word embeddings to form a combined feature embedding; a generator configured for generating a synthetic image based on the combined feature embedding. The synthetic image contains characters occurred in the input text with the handwriting context style defined in the handwriting context style description and context style variability introduced by the generator.

According to another aspect of the present invention, a method of training an apparatus for generating cursive handwritten text is provided. The apparatus comprising at least an input text word embedding unit, a context style word embedding unit, a word embedding transformer, a feature embedding combiner, a generator and a discriminator. The method comprises: encoding, by the input text word embedding unit, an input text to obtain an input text word embedding in an input text feature space; encoding, by the context style word embedding unit, a handwriting context style description into a context style description embedding in a handwriting context style feature space; transforming, by the word embedding transformer, the context style description embedding from the handwriting context style feature space to the input text feature space to obtain a handwriting context style feature embedding; combining, by the feature embedding combiner, the handwriting context style feature embedding and the input text word embeddings to form a combined feature embedding; generating, by the generator, a synthetic image based on the combined feature embedding, wherein the synthetic image contains characters occurred in the input text with handwriting context style defined in the handwriting context style description; and discriminating, by the discriminator, the characters in the generated synthetic image as real or fake handwritten characters and generating an update data representative of likelihood between the generated synthetic image and a reference labelled image, wherein the update data is used to optimize the generator.

According to a further aspect of the present invention, a method of using an apparatus for generating cursive handwritten text, the apparatus comprising at least an input text word embedding unit, a context style word embedding unit, a word embedding transformer, a feature embedding combiner, and a generator. The method comprises: encoding, by the input text word embedding unit, an input text to obtain an input text word embedding in an input text feature space; encoding, by the context style word embedding unit, a handwriting context style description into a context style description embedding in a handwriting context style feature space; transforming, by the word embedding transformer, the context style description embedding from the handwriting context style feature space to the input text feature space to obtain a handwriting context style feature embedding; combining, by the feature embedding combiner, the handwriting context style feature embedding and the input text word embeddings to form a combined feature embedding; generating, by the generator, a synthetic image based on the combined feature embedding; recognizing, by the recognition unit, the synthetic image to generate a corresponding machine recognizable text; and automatically annotating, by the annotation unit, the synthetic image with the corresponding machine recognizable text and the handwriting context style description to create a new labelled image data. The synthetic image contains characters occurred in the input text with handwriting context style defined in the handwriting context style description and context style variability introduced by the generator.

By introducing a diverse range of context style variability into cursive characters, the method provides a cost-effective way to generate a vast volume of artificial cursive handwritten words for training ML neural networks for cursive handwriting recognition.

BRIEF DESCRIPTION OF THE DRAWINGS

Embodiments of the invention are described in more detail hereinafter with reference to the drawings, in which.

DETAILED DESCRIPTION

In the following description, apparatuses and methods for producing labelled cursive handwritten text samples with context style variability suitable for forming training data for training ML neural networks for cursive handwriting recognition, methods of training the apparatuses, and methods of using the same and the likes are set forth as preferred examples. Skilled persons in the art will recognize that modifications, including additions and substitutions, can be made without deviating from the essence and scope of the invention. To avoid obfuscating the invention, certain specific details may have been omitted. Nevertheless, the disclosure is designed to provide sufficient information for a person skilled in the art to implement the teachings presented herein without requiring excessive experimentation.

Figure 1:
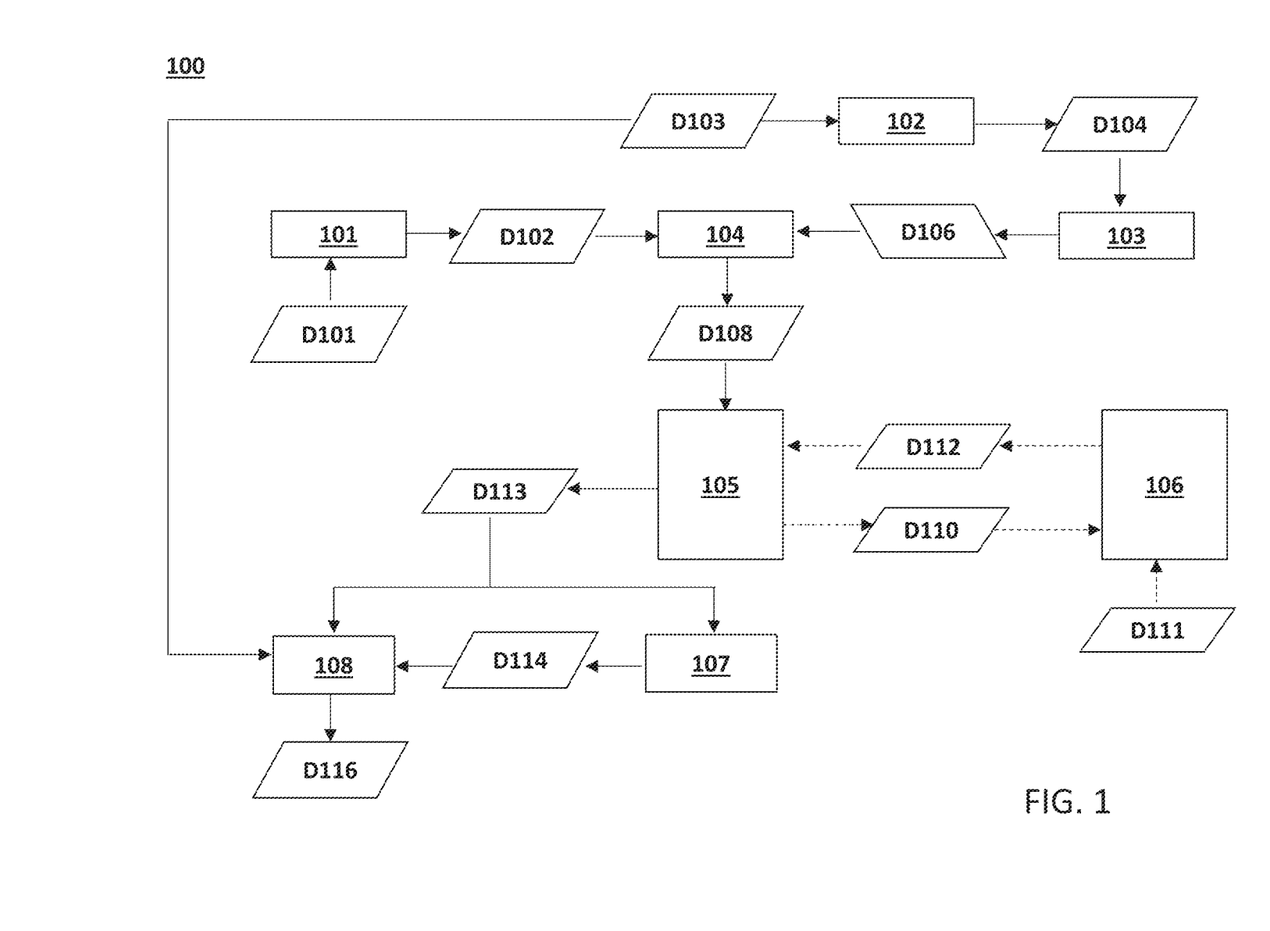
FIG. 1 shows a block diagram illustrating the functional units of an apparatus for producing labelled cursive handwritten text samples with context style variability in accordance with one embodiment of the present invention.

Referring to FIG. 1 for the following description. In accordance with one embodiment of the present invention, the apparatus 100 comprises an input text word embedding unit 101 configured for encoding an input text D101 to obtain an input text word embedding D102 in an input text feature space; a context style word embedding unit 102 configured for encoding a handwriting context style description D103 into a context style description embedding D104 in a handwriting context style feature space; a word embedding transformer 103 configured for transforming the context style description embedding D104 from the handwriting context style feature space to the input text feature space to obtain a handwriting context style feature embedding D106; a feature embedding combiner 104 configured for combining the handwriting context style feature embedding D106 and the input text word embeddings D102 to form a combined feature embedding D108; a generator 105 configured for generating a synthetic image D110 based on the combined feature embedding D108. The synthetic image D110 contains characters occurred in the input text D101 with handwriting context style defined in the handwriting context style description D103.

The apparatus 100 may further comprise a discriminator 106 configured for discriminating the characters in the generated synthetic image D110 as real or fake handwritten characters and generating an update data D112 representative of likelihood between the generated synthetic image D110 and a corresponding labelled image D111 during a training process. Accordingly, the update data D112 is used to optimize the generator 105.

In other words, the generator 105 and the discriminator 106 are collectively trained based a generative adversarial network (GAN), where the two parties are engaged in a two-player minimax game and iteratively trained in an adversarial manner. As the training progresses, the generator becomes more adept at generating realistic synthetic image that progressively fool the discriminator. Simultaneously, the discriminator improves its ability to distinguish between real and fake samples, making it harder for the generator to deceive it. This adversarial training process ends when an equilibrium is reached where the samples generated by the generator become indistinguishable from real data.

The apparatus 100 may further comprise a recognition unit 107 configured for recognizing a synthetic image D113 generated by the generator 105 to produce a corresponding machine recognizable text D114 during a text generation process; and an annotation unit 108 configured for automatically annotating the synthetic image D113 with the corresponding machine recognizable text D114 as well as the corresponding handwriting context style description D103 to create a labelled text image data D116 and storing the annotated text image data in a handwritten text image database (not shown).

Figure 2:
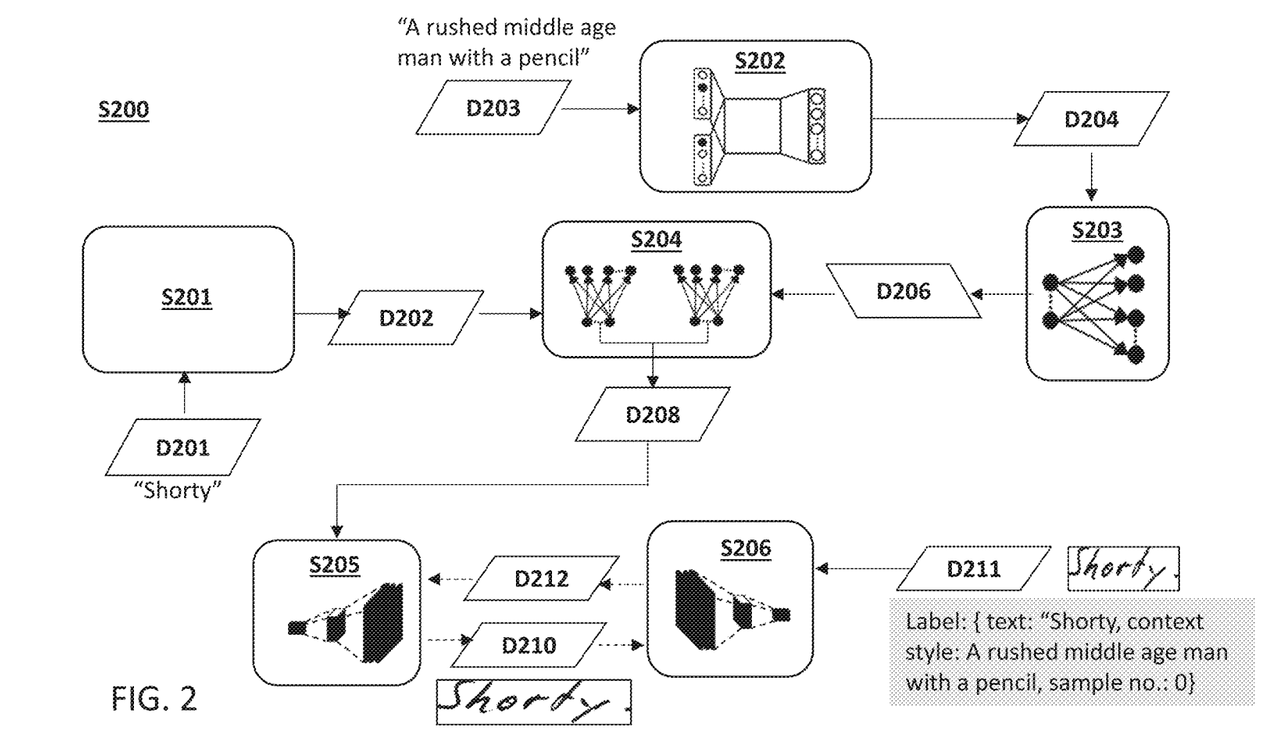
FIG. 2 depicts a logical dataflow diagram illustrating a method of training an apparatus for producing labelled cursive handwritten text samples with context style variability in accordance with various embodiments of the present invention.

Referring to FIG. 2 for the following description. FIG. 2 illustrates a method S200 of training an apparatus for producing labelled cursive handwritten text samples with context style variability in accordance with various embodiments of the present invention. The apparatus for generating cursive handwritten text comprises at least an input text word embedding unit, a context style word embedding unit, a word embedding transformer, a feature embedding combiner, a generator, a discriminator, a recognition unit, and an annotation unit.

The method S200 comprises the steps:

S201: encoding, by the input text word embedding unit, an input text D201 (e.g., "Shorty") to obtain an input text word embedding D202 in an input text feature space. The input text D201 may consist of various types of characters, such as handwritten characters that have been scanned into the system or printed characters generated by computers. These characters may originate from different languages, encompass alphanumeric characters, calligraphy, signatures, and other similar forms. The input text D201 may be encoded by the input text word embedding unit using a pre-trained word embedding model such as bag-of-words (BOW) model, Word2Ver, GloVe, or fastText. The input text word embedding D202 is then represented as a feature vector with components representative of feature of the corresponding word such as occurrence frequency of each word in the input text.

S202: encoding, by the context style word embedding unit, a handwriting context style description D203 (e.g., "A rushed middle age man with a pencil") into a context style description embedding D204 in a handwriting context style feature space. The handwriting context style description D203 serves as a text-based representation of various context style parameters that can influence the human writing styles, such as age, gender of the writer, the type of writing tool used by the writer, the writing speed and the emotion of the writer.

S203: transforming, by the word embedding transformer, the context style description embedding D204 from the handwriting context style feature space to the input text feature space to obtain a handwriting context style feature embedding D206. The transformation may be performed by applying a transformation function to the context style description embedding D204 to obtain the handwriting context style feature embedding D206.

S204: combining, by the feature embedding combiner, the handwriting context style feature embedding D206 and the input text word embeddings D202 to form a combined feature embedding D208. The combined feature embedding D108 may be obtained by summing the handwriting context style feature embedding D106 and the input text word embeddings D102. Alternatively, the combined feature embedding D108 may be obtained by averaging, multiplying or cascading the handwriting context style feature embedding D106 and the input text word embeddings D102.

S205: generating, by the generator, a synthetic image D210 (e.g., the image showing cursive handwritten text "Shorty") based on the combined feature embedding D208, wherein the synthetic image D210 contains characters occurred in the input text D201 with handwriting context style defined in the handwriting context style description D203.

S206: discriminating, by the discriminator, the characters in the generated synthetic image D210 as real or fake handwritten characters and generating an update data D212 representative of likelihood between the generated synthetic image D210 and a reference labelled image D211 (e.g., the image showing cursive handwritten text "Shorty" and labelled with {text: "Shorty, context style: A rushed middle age man with a pencil, sample no.: 0}); and optimizing the generator based on the update data D212.

At step S202, the handwriting context style description D203 may be encoded by the context style word embedding unit using a context style language model pretrained with a context style word bank in which context style words are categorized according to corresponding context style parameters. The context style description embedding D204 is then represented as a feature vector with a size (denoted as N) that equals to or greater than the number of context style parameters employed in the context style language model.

For instance, the context style description embedding may take a form of {"age": $c_1^{(i)}$, "gender": $c_2^{(i)}$, "emotion": $c_3^{(i)}$, "writing speed": $c_4^{(i)}$, "writing tool": $c_5^{(i)}$, ... }, where $c_1^{(i)}$, $c_2^{(i)}$, $c_3^{(i)}$, $c_4^{(i)}$ and $c_5^{(i)}$, are values for context style parameters "age", "gender", "emotion", "writing speed", and "writing tool" respectively.

Each value may be obtained through a specific algorithm depending on the respective context style parameter. For example, value for context style parameter "age" may be a positive integer representing the age of the writer. Value for context style parameter "gender" may be an index number having values "1" for male and "2" for "female". Value for context style parameter "emotion" may adopt a scale of happiness (e.g., a scale from 1 to 10, and "0" may be used to represent "not applicable") in which a higher value representing that the writer is happier. Value for context style parameter "writing speed" may adopt a scale of writing speed (e.g., a scale from 1 to 10, and "0" may be used to represent "not applicable") in which a higher value representing a higher speed. Value for context style parameter "writing tool" may adopt an indexing rule in which each type of writing tool is assigned with an index number (e.g., a pencil is assigned with index number "1", an ink pen is assigned with index number "2", ... etc.).

For instance, a handwriting context style description taking the form of "A happy 8-year-old boy with an ink pen" may be encoded into a context style description embedding in the form of {"age": 8, "gender": 1, "emotion": 10, "writing speed": 0, "writing tool": 2, ... }. For another instance, a handwriting context style description taking the form of "A rushed middle age man with a pencil" may be encoded into a context style description embedding in the form of {"age": 40, "gender": 1, "emotion": 0, "writing speed": 10, "writing tool": 1, ... }.

In some embodiments, the context style language model may be a continuous bag-of-words (CBOW) model which may be implemented with a neural network comprising an input layer, a projection (embedding) layer and an output layer. The input layer receives the context words, which are mapped to their respective word embeddings using the embedding layer. The output layer predicts the target word based on the processed context words.

The steps S205 and S206 may be performed iteratively in an adversarial manner. As the training progresses, the generator becomes more adept at generating realistic synthetic image that progressively fool the discriminator. Simultaneously, the discriminator improves its ability to distinguish between real and fake samples, making it harder for the generator to deceive it. This adversarial training process ends when an equilibrium is reached where the samples generated by the generator become indistinguishable from real data.

Figure 3:
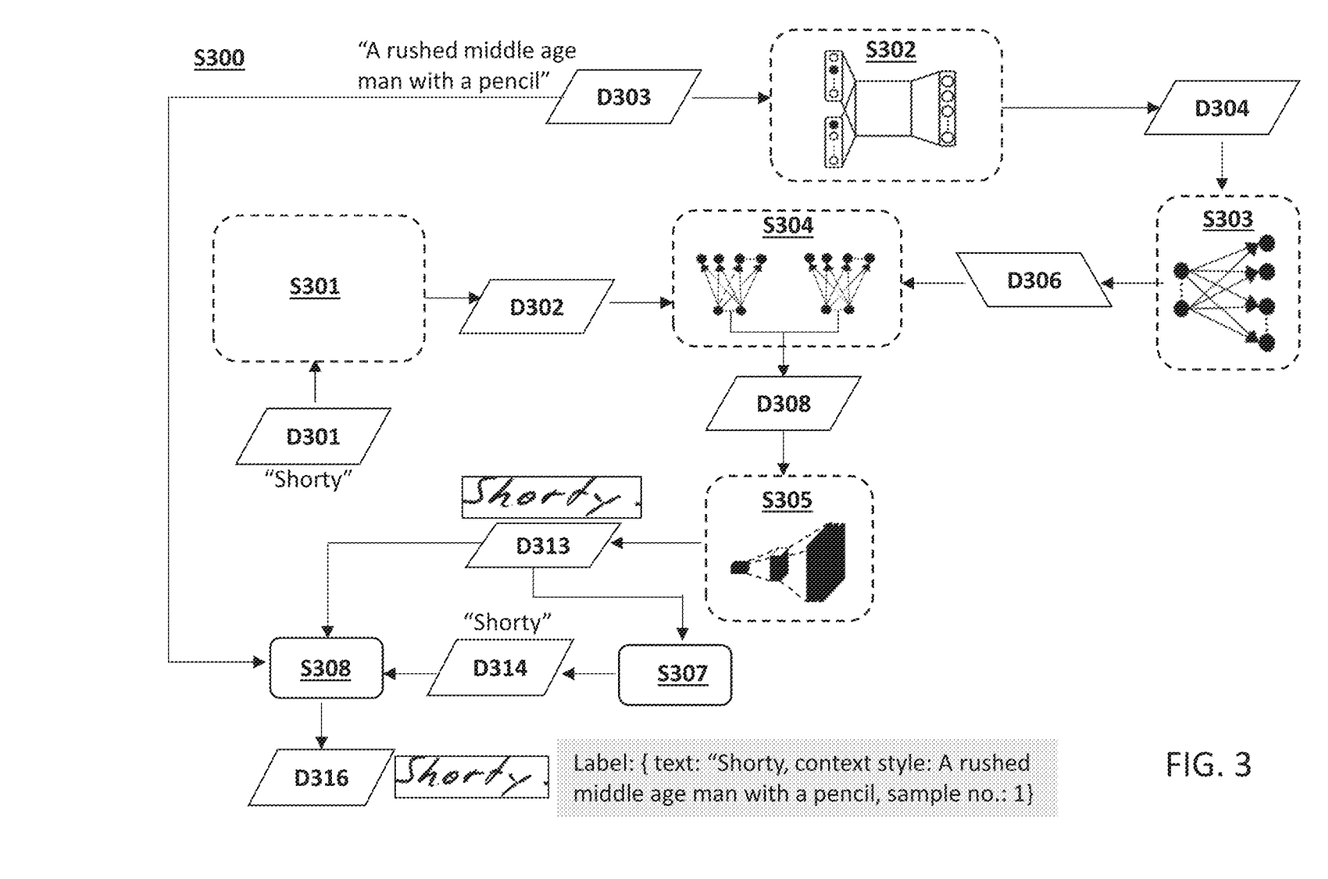
FIG. 3 depicts a logical dataflow diagram illustrating a method of using an apparatus for producing labelled cursive handwritten text samples with context style variability in accordance with various embodiments of the present invention.

Referring to FIG. 3 for the following description. FIG. 3 illustrates a method S300 of using an apparatus for producing labelled cursive handwritten text samples with context style variability in accordance with various embodiments of the present invention. The apparatus for generating cursive handwritten text comprises at least an input text word embedding unit, a context style word embedding unit, a word embedding transformer, a feature embedding combiner, a generator pretrained with the method S200 or the likes, a recognition unit, and an annotation unit.

S301: encoding, by the input text word embedding unit, an input text D301 (e.g., "Shorty") to obtain an input text word embedding D302 in an input text feature space.

S302: encoding, by the context style word embedding unit, a handwriting context style description D303 (e.g., "A rushed middle age man with a pencil") into a context style description embedding D304 in a handwriting context style feature space.

S303: transforming, by the word embedding transformer, the context style description embedding D304 from the handwriting context style feature space to the input text feature space to obtain a handwriting context style feature embedding D306.

S304: combining, by the feature embedding combiner, the handwriting context style feature embedding D306 and the input text word embeddings D302 to form a combined feature embedding D308.

S305: generating, by the generator, a synthetic image D313 (e.g., the image showing cursive handwritten text "Shorty") based on the combined feature embedding D308, wherein the synthetic image D313 contains characters occurred in the input text D301 with handwriting context style defined in the handwriting context style description D303 and context style variability introduced by the generator.

S307: recognizing, by the recognition unit, the synthetic image D313 to generate a corresponding machine recognizable text D314 (i.e., "Shorty"). The synthetic image may be recognized with an optical character recognizer by: analyzing the synthetic image to locate the regions that contain text using techniques like edge detection, connected component analysis or any other machine learning algorithms to segment characters from the text regions; extracting features such as shape, size and texture from the segmented characters; matching the extracted features again a database of known characters to identify the corresponding characters; and assembling the identified characters to form the corresponding machine recognizable text.

S308: automatically annotating, by the annotation unit, the synthetic image D313 with the corresponding machine recognizable text D314 as well as the corresponding handwriting context style description D303 to create a new labelled image data D316 (e.g., the image showing cursive handwritten text "Shorty" and labelled with {text: "Shorty, context style: A rushed middle age man with a pencil, sample no.: 1}); and storing the labelled image data D316 in a handwritten text image database.

Evaluation

Performance of the provided method has been evaluated. To evaluate performance of image generated by the provided method, 100 real handwritten text sample images, each containing around 50 characters, are randomly selected. For each sample image, an image is generated from the text using the style from the image. Then the generated image is manually evaluated to determine whether it corresponds with the style of the sample image. Evaluation results show that the provided method can achieve a style accuracy of 85%.

To evaluate performance of text recognition by the method provided by the present invention, the IAM dataset is split into a training dataset including 100,000 images produced by 283 writers and a test dataset including 1,861 images produced by 128 writers. The apparatus is trained with the training dataset. Then the trained apparatus perform recognition on the test dataset. The recognition accuracy is calculated using the Levenshtein metric. Evaluation results show that the provided method can achieve a field recognition accuracy of 88% and a character recognition accuracy of 97%.

Figure 4A:
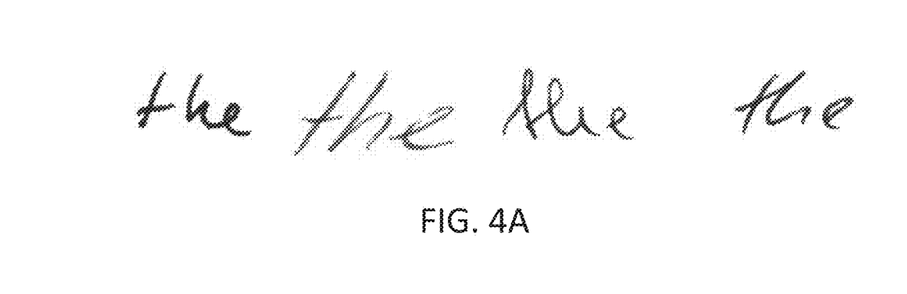
FIGS. 4A to 4C show a number of samples of synthetic image of characters generated by the present invention by introducing various variability.
Figure 4B:
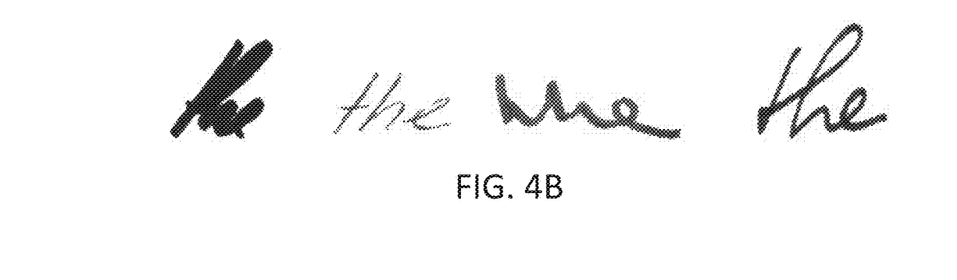
Figure 4C:
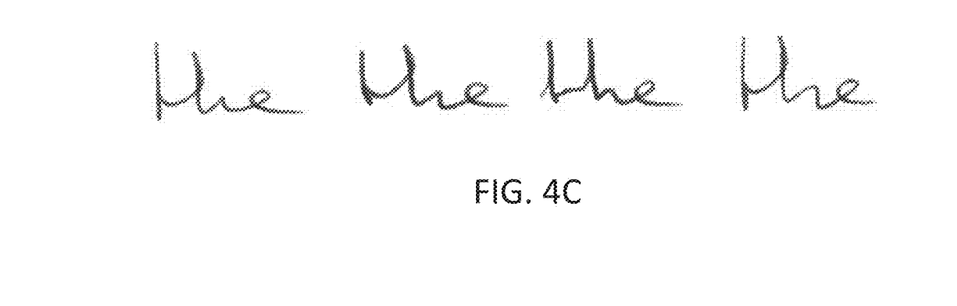

FIGS. 4A to 4C show a number of samples of synthetic image of characters generated by the present invention by introducing various variability. FIG. 4A shows the samples generated by introducing variability related to age and gender of writer; FIG. 4B shows the samples generated by introducing variability related to writing instruments; and FIG. 4C shows the samples generated by introducing variability related to writing speed.

The embodiments disclosed herein may be implemented using computing devices, computer processors, or electronic circuitries including but not limited to application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

All or portions of the embodiments may be executed in one or more general purpose or computing devices including server computers, personal computers, laptop computers, mobile computing devices such as smartphones and tablet computers.

The embodiments include computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Various embodiments of the present invention also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. An apparatus for producing labelled cursive handwritten text samples with context style variability, comprising:
   an input text word embedding unit configured for encoding an input text to obtain an input text word embedding in an input text feature space;
   a context style word embedding unit configured for encoding a handwriting context style description into a context style description embedding in a handwriting context style feature space;
   a word embedding transformer configured for transforming the context style description embedding from the handwriting context style feature space to the input text feature space to obtain a handwriting context style feature embedding;

a feature embedding combiner configured for combining the handwriting context style feature embedding and the input text word embeddings to form a combined feature embedding; and a generator configured for generating a synthetic image based on the combined feature embedding;

wherein the synthetic image contains characters occurred in the input text with the handwriting context style defined in the handwriting context style description and context style variability introduced by the generator.

2. The apparatus of claim 1, further comprising a discriminator configured for discriminating the characters in the generated synthetic image as real or fake handwritten characters and generating an update data representative of likelihood between the generated synthetic image and a corresponding labelled image during a training process; and the update data being used to optimize the generator.

3. The apparatus of claim 1, further comprising: a recognition unit configured for recognizing a synthetic image generated by the generator to produce a corresponding machine recognizable text during a text generation process; and an annotation unit configured for automatically annotating the synthetic image with the corresponding machine recognizable text as well as the corresponding handwriting context style description to create a labelled text image data and storing the annotated text image data in a handwritten text image database.

4. The method of claim 1, wherein the handwriting context style description is encoded by the context style word embedding unit using a context style language model pretrained with a context style word bank in which context style words are categorized according to corresponding context style parameters.

5. The method of claim 4, wherein the context style language model is a continuous bag-of-words (CBOW) model.

6. A method of training an apparatus for producing labelled cursive handwritten text samples with context style variability, the apparatus comprising at least an input text word embedding unit, a context style word embedding unit, a word embedding transformer, a feature embedding combiner, a generator and a discriminator, the method comprises:

encoding, by the input text word embedding unit, an input text to obtain an input text word embedding in an input text feature space;

encoding, by the context style word embedding unit, a handwriting context style description into a context style description embedding in a handwriting context style feature space;

transforming, by the word embedding transformer, the context style description embedding from the handwriting context style feature space to the input text feature space to obtain a handwriting context style feature embedding;

combining, by the feature embedding combiner, the handwriting context style feature embedding and the input text word embeddings to form a combined feature embedding;

generating, by the generator, a synthetic image based on the combined feature embedding, wherein the synthetic image contains characters occurred in the input text with handwriting context style defined in the handwriting context style description;

discriminating, by the discriminator, the characters in the generated synthetic image as real or fake handwritten characters and generating an update data representative of likelihood between the generated synthetic image and a reference labelled image, wherein the update data is used to optimize the generator.

7. The method of claim 6, wherein the handwriting context style description is encoded by the context style word embedding unit using a context style language model pretrained with a context style word bank in which context style words are categorized according to corresponding context style parameters.

8. The method of claim 7, wherein the context style language model is a continuous bag-of-words (CBOW) model.

9. The method of claim 6, wherein the generation of synthetic image by the generator and the discrimination of the generated synthetic image by the discriminator are performed iteratively in an adversarial manner.

10. A method of using an apparatus for producing labelled cursive handwritten text samples with context style variability, the apparatus comprising at least an input text word embedding unit, a context style word embedding unit, a word embedding transformer, a feature embedding combiner, a generator, a recognition unit and an annotation unit; the method comprises:

encoding, by the input text word embedding unit, an input text to obtain an input text word embedding in an input text feature space;

encoding, by the context style word embedding unit, a handwriting context style description into a context style description embedding in a handwriting context style feature space;

transforming, by the word embedding transformer, the context style description embedding from the handwriting context style feature space to the input text feature space to obtain a handwriting context style feature embedding;

combining, by the feature embedding combiner, the handwriting context style feature embedding and the input text word embeddings to form a combined feature embedding;

generating, by the generator, a synthetic image based on the combined feature embedding;

recognizing, by the recognition unit, the synthetic image to generate a corresponding machine recognizable text; and automatically annotating, by the annotation unit, the synthetic image with the corresponding machine recognizable text and the handwriting context style description to create a new labelled image data; and wherein the synthetic image contains characters occurred in the input text with handwriting context style defined in the handwriting context style description and context style variability introduced by the generator.

11. The method of claim 10, wherein the handwriting context style description is encoded by the context style word embedding unit using a context style language model pretrained with a context style word bank in which context style words are categorized according to corresponding context style parameters.

12. The method of claim 11, wherein the context style language model is a continuous bag-of-words (CBOW) model.

* * * * *